(12) United States Patent
Doddavula et al.

(10) Patent No.: US 9,749,183 B2
(45) Date of Patent: Aug. 29, 2017

(54) SYSTEM AND METHOD FOR DETERMINING OPTIMAL COMBINATIONS OF COMPUTER SERVERS

(71) Applicant: Infosys Limited, Bangalore (IN)

(72) Inventors: Shyam Kumar Doddavula, Bangalore (IN); Mudit Kaushik, Subhash Bazaar Mawana (IN); Akansha Jain, Roorkee (IN)

(73) Assignee: Infosys Limited, Bangalore (IN)

( * ) Notice: Subject to any disclaimer, the term of this patent is extended or adjusted under 35 U.S.C. 154(b) by 573 days.

(21) Appl. No.: 14/060,600

(22) Filed: Oct. 22, 2013

(65) Prior Publication Data
US 2014/0149566 A1 May 29, 2014

Related U.S. Application Data

(63) Continuation of application No. 13/111,224, filed on May 19, 2011, now Pat. No. 8,595,363.

(30) Foreign Application Priority Data

Apr. 7, 2011 (IN) .......................... 1214/CHE/2011

(51) Int. Cl.
*H04L 12/24* (2006.01)
*G06F 9/50* (2006.01)
*G06F 17/16* (2006.01)

(52) U.S. Cl.
CPC ............ *H04L 41/12* (2013.01); *G06F 9/5061* (2013.01); *H04L 41/0803* (2013.01); *H04L 41/0823* (2013.01); *G06F 17/16* (2013.01)

(58) Field of Classification Search
CPC ........................ G06F 7/76; G06F 17/16; H04L 41/08–41/0803; H04L 41/0823–41/0833; H04L 41/12–41/145
See application file for complete search history.

(56) References Cited

U.S. PATENT DOCUMENTS 4,692,876 A 9/1987 Tenma et al.
5,050,090 A 9/1991 Golub et al.
(Continued)

OTHER PUBLICATIONS

Ajiro et al., "Improving Packing Algorithms for Server Consolidation," Proceedings of the Computer Measurement Group's 2007 Int'l Conf. NEC Corporation (Systems Platforms Research Laboratories) (2007).

*Primary Examiner* — Eric Myers
(74) *Attorney, Agent, or Firm* — Klarquist Sparkman, LLP (57) ABSTRACT

A computer-implemented method, apparatus, and non-transitory computer-readable medium for determining optimal combinations of elements having multiple dimensions, including removing all multi-dimensional elements from a combination matrix which have a dimension corresponding to a highest classification in a plurality of classifications, iteratively combining one or more multi-dimensional elements from a first end of the combination matrix and one or more multi-dimensional elements from a second end of the combination matrix to generate one or more combined multi-dimensional elements, incrementing a count of packed combinations when a combined multi-dimensional element in the one or more combined multi-dimensional elements has a dimension corresponding to the highest classification in the plurality of classifications, and removing a combined multi-dimensional element in the one or more combined multi-dimensional elements from the combination matrix when the combined multi-dimensional element has a dimension corresponding to the highest classification in the plurality of classifications.

24 Claims, 5 Drawing Sheets

(56) References Cited

U.S. PATENT DOCUMENTS

| | | |
|---|---|---|
| 5,473,545 A | 12/1995 | Schausten |
| 6,832,129 B2 | 12/2004 | Lesh et al. |
| 7,478,176 B2 | 1/2009 | Zimmer et al. |
| 7,761,548 B2 | 7/2010 | Snyder et al. |
| 8,255,516 B1 | 8/2012 | Zhang et al. |
| 8,595,363 B2 | 11/2013 | Doddavula et al. |
| 8,700,752 B2 | 4/2014 | Bouillet et al. |
| 8,918,750 B1 | 12/2014 | Moffitt |
| 8,959,523 B2 | 2/2015 | Patil et al. |
| 9,183,342 B2 | 11/2015 | Moffitt |
| 9,396,035 B2 | 7/2016 | Moffitt |
| 9,400,697 B2 | 7/2016 | Moffitt |
| 2006/0107087 A1* | 5/2006 | Sieroka ............... G06F 9/4856 714/4.1 |
| 2010/0005173 A1 | 1/2010 | Baskaran et al. |
| 2011/0173327 A1* | 7/2011 | Chen .................... G06F 9/5066 709/226 |

\* cited by examiner

SYSTEM AND METHOD FOR DETERMINING OPTIMAL COMBINATIONS OF COMPUTER SERVERS

RELATED APPLICATION DATA

This application is a continuation of application Ser. No. 13/111,224 filed on May 19, 2011 (now pending), which claims priority to Indian Patent Application No. 1214/CHE/2011, filed Apr. 7, 2011, both of which are hereby incorporated by reference in their entirety.

BACKGROUND

With the increasing adoption of Service-oriented Architecture (SOA) and cloud computing technologies where Information Technology, including infrastructure, platforms and applications are delivered as services, there is an increasing use of the shared resource model. In such a model, computing and IT resources are shared across multiple applications. Accordingly, there is an increasing need for solutions that optimize the resource allocation. Power, cooling and real estate costs represent a significant portion of the overall cost in operating a cloud computing platform, service or datacenter. The reduction or optimization of resources associated with such costs creates a net benefit in total operating cost, reduces the need for expensive infrastructure and provides an opportunity to expand the platform. The challenge in consolidating such workloads is to minimize the number of physical servers while taking into consideration the resource needs across multiple dimensions. In this space, the dimensions include, but are not limited to, CPU, memory, data storage, I/O, networking bandwidth, network topology, and router utilizations—which are all subject to change in real-time dependent upon user needs and workloads.

Server consolidation methods aim to provide an efficient usage of computer server resources in order to reduce the total number of servers required for a particular software implementation, or a collection of software implementations. That is, server consolidation functions to address the problem of "server sprawl". Server sprawl is understood in the art to refer to multiple under-utilized servers consuming more resources than is necessary to provide the functionality required by the software packages loaded thereupon.

Server consolidation may generally be classified into three stages: centralization, physical consolidation and data and application integration. Centralization involves moving servers to a common location. Physical consolidation involves moving a large number of existing servers to a small number of high-performance servers. Storage consolidation is also a kind of physical consolidation where disparate or related data and applications are integrated into a common database and common application. These classifications operate to reduce server under-utilization—typical levels of under-utilization in a non-consolidated environment may range from 15-20% of individual physical server capacity being unused.

A technique for physical consolidation, which is well known in the art, is the use of server virtualization technology. Virtualization enables multiple existing servers to be moved to share the resources of a single computer, or a dynamically selected grouping of computers. That is, software is used to divide one physical server into multiple isolated virtual environments or instances. Multiple methods of virtualization are known to those skilled in the art, e.g., hardware emulation, para-virtualization, OS-level virtualization, application level virtualization, etc. Regardless of the particular virtualization implementation method, the goal is to minimize the number of physical servers. This goal, minimizing the number of physical servers, competes directly with the twin goal of ensuring that sufficient resources are made available to avoid performance degradation. Put another way, sufficient resources are required to avoid degradation in performance, wherein the sum of resource utilization for virtual machines on a physical server (destination server) does not exceed the threshold limits prescribed for that particular destination server, while the number of destination servers is as small as possible to provide a cost benefit to the server consolidation process.

The optimization of destination servers may be viewed as a bin or vector packing problem. That is, items of different sizes must be packed into a minimum number of bins with a defined capacity. The basic bin packing problem is as follows: given N objects, each with a value $v_i$, $i=1, \ldots, N$, these objects must be packed in as few bins as possible such that $\Sigma v_i$ of objects packed in the same bin does not exceed the bin's capacity. The bin packing problem may be understood in the server consolidation context as follows: objects for server consolidation are existing servers, object sizes are resource utilizations, bins are destination servers, and the bin capacity is the utilization threshold of the destination servers. Resource utilizations may include existing server CPU, disk and memory requirements. Where multiple resources (CPU, disk, memory, etc.) are being considered, the resources form multiple dimensions in the packing problem. The solutions to bin and vector packing problems are the same in the one-dimensional case. However, in multi-dimensional cases, the problem is considered as a vector packing problem.

A two-dimensional server packing problem may be formally understood as follows: Let $\rho_{c_i}$ and $\rho_{d_i}$ be the CPU and disk utilization of an existing server $s_i$ ($i=1, \ldots, n$), $X_j$ be a set of existing servers consolidated into a destination server $s'_j$ ($j=1, \ldots, m$), and $R_c$ and $R_d$ be the thresholds of CPU and disk utilizations prescribed for the destination servers. Thus n existing servers are all consolidated into m destination servers. The problem is then to minimize n under the constraints that $\Sigma_{s_i \in x_j} \rho_{c_i} \leq R_c$ and $\Sigma_{s_i \in x_j} \rho_{d_i} \leq R_d$. Note, however, that the performance characteristics (CPU, disk, etc.) of a destination server may be higher than that of an existing server. In such an instance, if the performance of a destination server is h times higher than that of an existing server, CPU utilization $\rho$ measured on the existing server is converted into $\rho/h$ on the destination server. Further, the virtualization overhead increases the utilizations of servers running on virtual machines and the threshold values for destination servers must be modified accordingly.

There are several methods well known in the art to solve such multi-dimensional vector packing problems, for example, the First Fit Decreasing (FFD) algorithm. The FFD algorithm may be understood by the following pseudo code.

```
sort existing servers to {s₁, ..., sₙ} in descending order;
m ← 1; X₁ ← { };
for i ← 1 to n do
    for j ← 1 to m do
        if packable (Xⱼ, sᵢ) then
            Xⱼ ← Xⱼ ∪ {sᵢ};
            break
        fi
    end for;
    if j = m + 1 then      /* if fail to pack sᵢ, */
        m ← m + 1;          /* a new server is added */
```

-continued

```
        X_m ← {s_i}              /* to have s_i */
    fi
end for
```

The FFD algorithm addresses the server packing problem by first receiving n existing servers and sorting them in descending order of utilizations of a certain resource. After the algorithm is executed, it produces server accommodations $X_j$ (j=1, ..., m), where m is the number of destination servers. The function packable($X_j$, $s_i$) returns true if packing existing server $s_i$ into destination server $s'_j$ satisfies the constraints (i.e., the utilization of $s'_j$ does not exceed a threshold for any resource); otherwise it returns false. FFD sequentially checks if all existing servers $s_1, \ldots, s_n$ can be packed into one of m current destination servers. FFD then packs $s_i$ into a destination server first found to be able to accommodate it. If $s_i$ cannot be packed into any current destination server, the (m+1)-th destination server is added to accommodate it. The complexity of this FFD algorithm is $O(n^2)$ because m is almost proportional to n.

A second algorithm for vector packing known in the art is the Least Loaded algorithm (LL). The LL algorithm may be understood by the following pseudo code.

```
sort existing servers to {s_1, ..., s_n} in descending order;
m←LB({s_1, ..., s_n });
while true do
    for j ← 1 to m do
        X_j←{ }         /* initialization */
    end for;
    for i←1 to n do
        sort destination servers to {X_1, ..., X_m} in ascending order;
        for j←1 to m do
            if packable (X_j, s_i) then
                X_j←X_j∪{s_i};
                break
            fi
        end for;
        if j= m + 1 then   /* If fail to pack s_i, a new server is added */
            m ←m + 1;
            break
        fi
    end for;
    if i = n + 1 then      /* all packed */
        break
    fi
end while
```

The LL algorithm attempts to balance the load between servers by assigning incoming jobs to the least-loaded server. In server packing, an existing server with a high utilization is packed into a server with low utilization. The function LB($\{s_1, \ldots, s_n\}$) returns the theoretical lower bound for the number of destination servers that accommodate existing servers $\{s_1, \ldots, s_n\}$. The lower bound is the smallest integer of numbers larger than the sum of the utilizations divided by a threshold. The lower bound for the CPU is $LB_c = |\Sigma_{i=1}^n \rho_c / R_c|$, while that for the disk is $LB_d = |\Sigma_{i=1}^n \rho_d / R_d|$. Function LB($\{s_1, \ldots, s_n\}$) returns the larger integer of the two lower bounds.

There are two differences between LL and FFD. First, LL starts repacking after a new destination server is added when it has failed to pack an existing server into current m destination servers. This is aimed at balancing the load between a newly added destination server and the others. In contrast, FFD packs the existing server in question into a new destination server and continues to pack the remaining existing servers. LL initializes m to the lower bound to save time, even though we can also start with m=1. Second, LL sorts destination servers (which accommodate $X_1, \ldots, X_m$) in ascending order of utilizations each time before packing an existing server to pack it into a less-loaded destination server. The complexity of LL is $O(d \cdot n^2 \log n)$ where d is the difference between the lower bound and the final number m of destination servers.

The LL and FFD algorithms are limited in that only a single dimension is optimized at a time, i.e., neither LL nor FFD optimize multiple resources in a simultaneous manner. Further, because each dimension must first be considered independent of other dimensions, there is an inherent performance (time) cost to the optimization process.

DETAILED DESCRIPTION

There is a need in the art for a faster method of vector packing that is capable of handling multiple dimensions in a simultaneous manner. For example, in the field of server consolidation in virtualization environments, there is a specific need to be able to quickly determine the optimal server allocation arrangement. However, the optimal solution must be determined in a short enough time period such that changing workloads can be accommodated. Such environments may require thousands of existing servers to be consolidated to a much smaller number of destination servers in real-time or in advance of actual load balancing. Thus, speed in determining server consolidation may take priority over accuracy.

Various embodiments of the present invention will be described in detail with reference to the drawings. Reference to various embodiments does not limit the scope of the invention, which is limited only by scope of claims attached hereto. Additionally, any examples set forth in this specification are not intended to be limiting and merely set forth some of the many possible embodiments. Also, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items.

The disclosed embodiments are a method of solving a vector packing problem having multiple dimensions. Stated another way, the embodiments determine optimal combinations of elements having values along multiple dimensions, comprising the conversion of continuous values of each dimension to be considered for packing into discrete values using various techniques known in the field of fuzzy logic, generating a sorted combination matrix of the elements to be packed (sorted by the values along each dimension), setting individual thresholds for the highest distribution interval in each dimension or a common threshold value for all dimension, and optimizing the matrix to determine the optimal packing.

The vector packing problem, as applied in the server consolidation context, may be understood to encompass existing servers as objects for server consolidation, resource utilizations as object sizes, destination servers as bins, and the utilizations thresholds of the destination servers as bin capacities. Object sizes include multiple dimensional values and may be understood as existing server CPU, disk, I/O, memory utilization and any other measurable requirement placed on an existing server or network arrangement by an application, process, user or hardware. The methodologies utilized in the prior art require an indeterminate amount of time to arrive at the optimal packing solution and are not suited to operating in a dynamic environment where user, hardware, and application workloads are in constant change. A solution is therefore required which provides solutions to the described vector packing problem in a predictable period of time.

Figure 1:
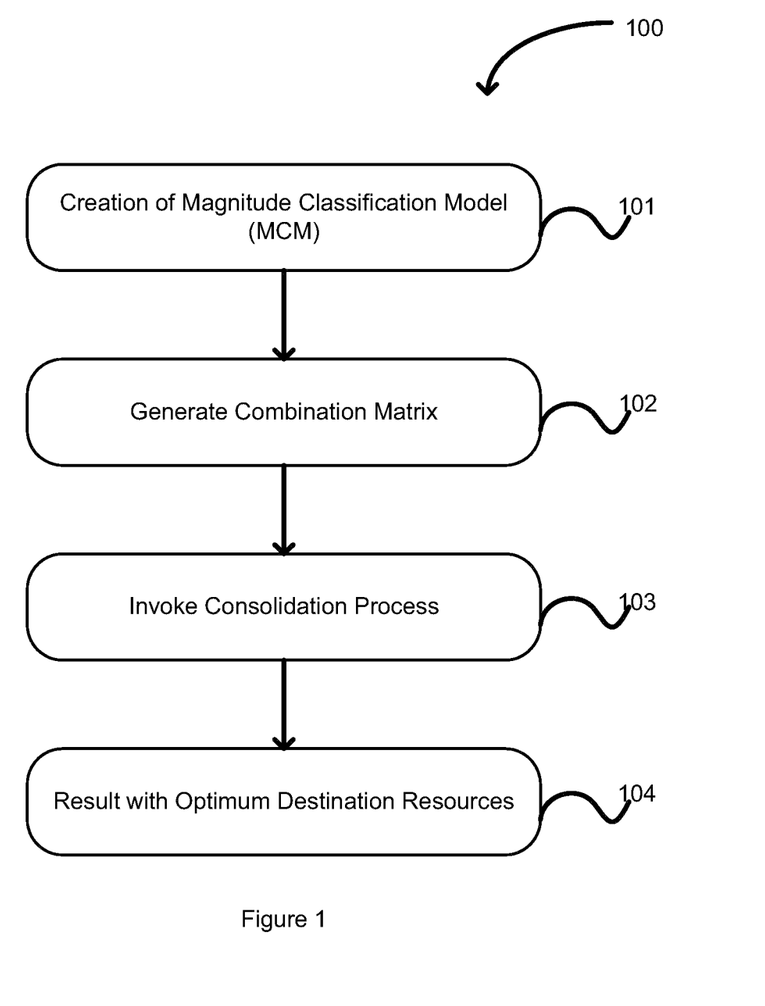
FIG. 1 is a functional flow block diagram of an exemplary system.

FIG. 1 depicts an overall view 100 of an embodiment. At Block 101 a Magnitude Classification Model (MCM) is defined. The MCM consists of a pairing of a declared magnitude name (or state) with a defined distribution interval. Magnitudes (or states) may be declared as representing levels of utilization, e.g., full, large, medium, small, or as references for the defined distribution intervals, i.e., A, B, C, D, etc. The MCM is used in the consolidation process 103 to generate a combination matrix of the resource dimensions aligned along magnitude classifications. The distribution intervals in the MCM may be varied to change the granularity or accuracy of the consolidation process 103. Accordingly, the number of defined distribution intervals impacts the amount of time it takes to complete the consolidation process 103. A reduced number of intervals results in faster sorting at the cost of accuracy. In an embodiment, the MCM is defined with uniform distribution intervals. The threshold values may be defined individually for each dimension, or as a common value for all dimensions. Table 1 provides an exemplary MCM having uniform distribution intervals, divided into four sub-units. Note, however, that the intervals may be divided into as many intervals as appropriate given the data set. For example, the intervals may be in uniform increments of 5%, 10%, 20%, or 25%.

TABLE 1

| Name (Magnitude) | Distribution Interval |
|---|---|
| Full (F) | Greater than or equal to 75%, but less than or equal to 100% |
| Large (L) | Greater than or equal to 50%, but less than 75% |
| Medium (M) | Greater than or equal to 25%, but less than 50% |
| Small (S) | Greater than or equal to 0%, but less than 25% |

The distribution intervals can be non-uniform. That is, defined threshold ranges may include the intervals 0-10%, 10-15%, 15-25%, etc. Such an arrangement of distribution intervals may be desirable, for example, where, based on historical data, it has been determined that there is a greater incidence of dimensional values under a particular magnitude. Accordingly, the MCM may be fine tuned to capture more realistic classifications and provide greater accuracy and granularity in the consolidation process 103. Table 2 provides an exemplary MCM having non-uniform distribution levels.

TABLE 2

| Name (Magnitude) | Distribution Interval |
|---|---|
| A | Greater than or equal to 70%, but less than or equal to 100% |
| B | Greater than or equal to 60%, but less than 70% |
| C | Greater than or equal to 50%, but less than 60% |
| D | Greater than or equal to 48%, but less than 50% |
| E | Greater than or equal to 46%, but less than 48% |
| F | Greater than or equal to 44%, but less than 46% |
| G | Greater than or equal to 42%, but less than 44% |
| H | Greater than or equal to 40%, but less than 42% |
| I | Greater than or equal to 30%, but less than 40% |
| J | Greater than or equal to 0%, but less than 30% |

In the instance of a single dimensional resource, i.e., a resource having only one attribute, the MCM will produce a simple classification of possible combinations. Referring to Table 1, the single dimension could only be classified as Full (F), Large (L), Medium (M) or Small (S), which may be represented as a one-dimensional array. In the instance of multiple dimensional resources, the number of possible combinations form a combination matrix 102. The generation of a combination matrix 102 is dependent on the number of dimensions of the resources and the number of intervals in the MCM.

Figure 2:
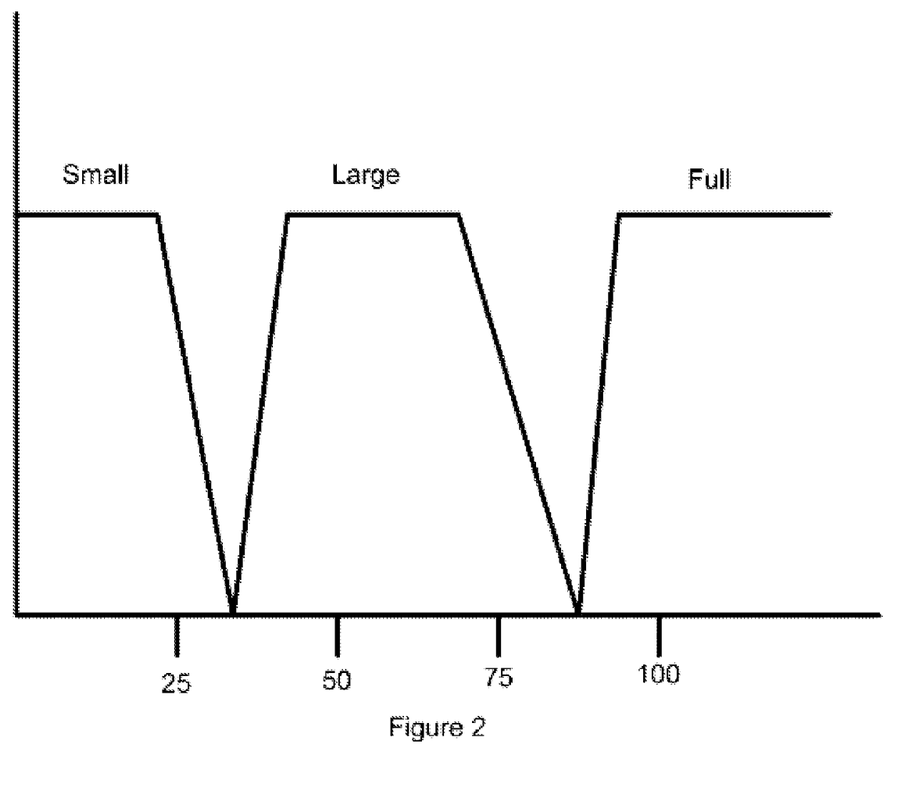
FIG. 2 is a graph of exemplary fuzzy logic rule set that may be implemented in an embodiment.

In an embodiment, the mapping of each dimensional value to a magnitude classification is implemented by applying principles of fuzzy logic. Referring to FIG. 2, it is understood by those skilled in the art that fuzzy logic truth value assessments may be used to map dimensional values to magnitude classifications.

In yet another embodiment, the mapping of each dimensional value to a magnitude classification may be implemented by the following exemplary pseudo code. The following code considers only a single dimensional mapping (network utilization), but may be logically extended to include n number of dimensions.

```
new arrayList
for i ← 0 to numberExistingServers do
    serverIntensityCombinationName="";
    if (existingServer.Network = true) {
        if (existingServer.NetworkUtilization > NetworkThreshold( )*.9){
            serverIntensityCombinationName=serverIntensityCombinationName+"A"; }
        else if (existingServer.NetworkUtilization > NetworkThreshold( )*.8 {
            serverIntensityCombinationName=serverIntensityCombinationName+"B" }
    ...
```

```
        else if (existingServer.NetworkUtilization > NetworkThreshold( )*.1 {
            serverIntensityCombinationName=serverIntensityCombinationName+"I" }
        else serverIntensityCombinationName=serverIntensityCombinationName+"J" }
end for
```

At Block 102, the combination matrix is generated, which is a simple matrix based on the number of combinations available in the MCM, defined above. The dimensions of the matrix are the number of possible combinations, defined by the number of dimensions and number of distribution intervals being considered. In the server consolidation context, the number of dimensions is the number of resource attributes being considered. The number of total combinations is $m^n$, where m equals the number of distribution intervals and n equals the number of dimensions. For example, referring to Table 1, the simple case of four defined distribution intervals for a two-dimensional problem provides $4^2=16$ total number of combinations. Accordingly, the dimensions of the combination matrix are $m^n$. The multi-dimensional combinations are inserted into the combination matrix in descending order, i.e., in order of decreasing combinational magnitude as defined by the MCM. The combination matrix in this simple case (inserting all possible combinations for the purpose of explanation) is as follows:

$$\begin{pmatrix} FF & FL & FM & FS \\ LF & LL & LM & LS \\ MF & ML & MM & MS \\ SF & SL & SM & SS \end{pmatrix}$$

Table 3 provides examples of how the alternative combination matrices may be sized.

TABLE 3

| No. of Dimensions | No. of Intervals | Combination Matrix |
|---|---|---|
| 2 | 2 | 2 × 2 |
| 2 | 3 | 3 × 3 |
| 2 | 4 | 4 × 4 |
| 2 | 10 | 10 × 10 |
| 3 | 2 | 2 × 2 × 2 |
| 3 | 3 | 3 × 3 × 3 |
| 3 | 10 | 10 × 10 × 10 |
| n | M | $m^n$ |

A feasibility table provides the rule set for possible combinations. That is, the feasibility table defines the constraints on dimensional value combinations under the defined MCM. Table 4 provides an exemplary feasibility table for the simple case described in Table 1.

TABLE 4

| Name (Magnitude) | Combinations Possible | Result |
|---|---|---|
| Full (F) | No combination possible, considered being at highest elevation, i.e., no capacity to consolidate further. | — |
| Large (L) | May be combined with Small (S) | Large (L) + Small (S) = Full (F) |

TABLE 4-continued

| Name (Magnitude) | Combinations Possible | Result |
|---|---|---|
| Medium (M) | May be combined with Medium (M) | Medium (M) + Medium (M) = Full (F) |
|  | May be combined with Small (S) | Medium (M) + Small (S) = Large (L) |
| Small (S) | May be combined with Large (L) | Small (S) + Large (L) = Full (F) |
|  | May be combined with Medium (M) | Small (S) + Medium (M) = Large (L) |
|  | May be combined with Small (S) | Small (S) + Small (S) = Medium (M) |

Figure 3:
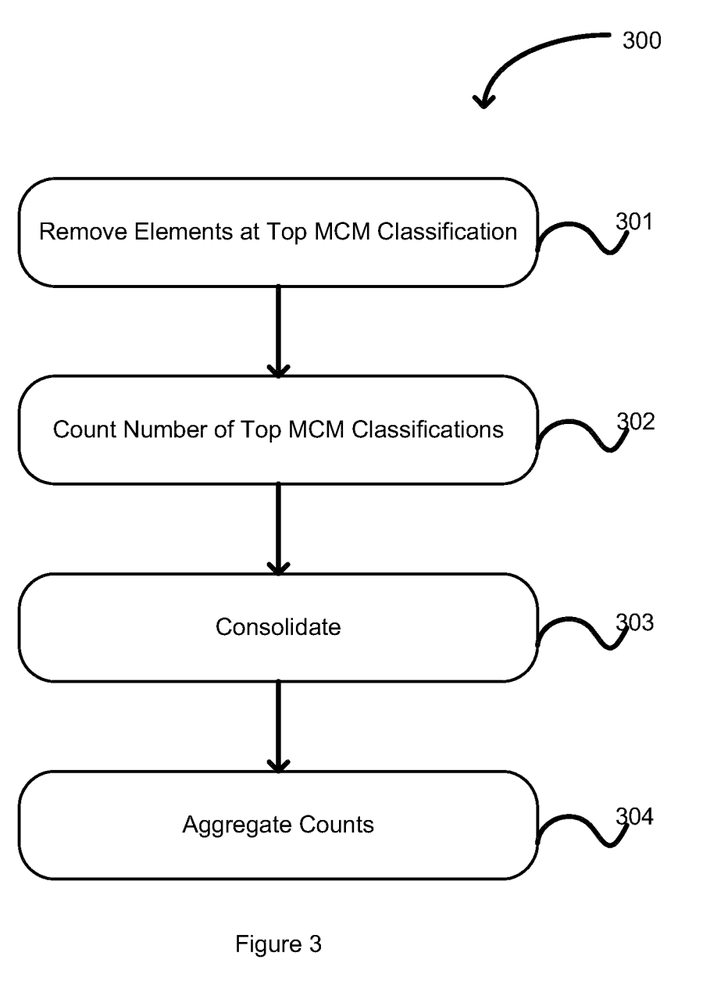
FIG. 3 is a flowchart of an exemplary embodiment of the consolidation process.

Referring to FIG. 3, the consolidation process 300 includes steps 301, 302, 303, and 304. The inputs to the consolidation process 300 include the populated combination matrix and the MCM rule set. In this example, referring to Table 1, Table 4 and considering only a two-dimensional problem, the initial combination matrix may be described as follows:

$$\begin{pmatrix} FF & FL & FM & FS \\ LF & LL & LM & LS \\ MF & ML & MM & MS \\ SF & SL & SM & SS \end{pmatrix}$$

At initial step 301, all combination elements consisting of the top most magnitude or distribution interval of the MCM are removed. Such elements are considered as being completely full and cannot be packed any further. The matrix may be resized to fit only the remaining elements. In this example, all elements consisting a dimensional value "F", i.e. the top most magnitude of Table 1, are removed. Accordingly, the resulting matrix may be described as:

$$\begin{pmatrix} LL & LM & LS \\ ML & MM & MS \\ SL & SM & SS \end{pmatrix}$$

Each combination element removed in 301 is added to the total count or total packed element combination 302. In the server consolidation context, the total count is representative of the number of destination servers. Accordingly, the current number of destination servers is 7.

The consolidation 303 of remaining elements is completed via an iterative process of combining the combination element(s) of the first cell of the matrix with the combination element(s) of the last cell of the matrix. In this example, the first element LL is added to the last element SS with a packed element combination of FF, as defined in the feasibility table, Table 4. If the packed element combination exceeds the threshold for the highest MCM classification or distribution interval defined in Table 1, then the first element is marked as equivalent to the highest classification and considered to be completely full and the next element is considered for consolidation. If, however, the packed element combination does not exceed the threshold for the highest MCM classification or distribution level, then the next to last added element is added to the packed element combination. This process continues until all combination elements have been optimized. In this example, the packed element combination FF is at the highest MCM classification under Table 1, and is marked as such and considered full. A subsequent consolidation iteration attempts to combine combination elements LM and SM, resulting again in a packed element combination of FF, which is full. Table 5 shows the possible iterations in this example.

TABLE 5

| Iteration | Combination Result |
|---|---|
| 1 | LL + SS = FF (Full) |
| 2 | LM + SM = FF (Full) |
| 3 | LS + SL = FF (Full) |
| 4 | ML + MS = FF (Full) |
| 5 | MM (remainder, combinations exhausted) |

The counts of 302 and 303 are aggregated to provide the total packed combination count, i.e., total destination server count. In this example, the total is 12 destination servers. The following is exemplary pseudo code for the consolidation process 303.

```
existing servers {s_1, ..., s_m} having attributes {a_1, ..., a_n}
MagnitudeCombination [ ] ← [s_1.a_1.a....a_n, s_2.a_1.a....a_n, ..., s_m.a_1.a....a_n]
existingServerCount ← m;
destinationServerCount ← 0;
for x ← 1 to m do
    for y ← 1 to n do
        if s_x.a_n.Magnitude contains any attribute matching top MCM
            Classification "A"
                destinationServerCount = destinationServerCount + 1;
        else
            populate the MagnitudeCombination[ ] by increasing the
                count of the respective combination
end for
for i ← 1 to MagnitudeCombination[ ].size
    if (MagnitudeCombination[k].Count ! = 0)
        for l ← (MagnitudeCombination[MagnitudeCombination.size −
            k]) to
            (MagnitudeCombination[ ].size)
            if (MagnitudeCombination[k].Count ! = 0 &&
            (MagnitudeCombination[l]) ! = 0
                && MagnitudeCombination[k] not equal to
                MagnitudeCombination[l]))
                if (MagnitudeCombination[k].Count ≥
                MagnitudeCombination [l].Count)
                    destinationServerCount =
                    destinationServerCount +
                        MagnitudeCombination[l].Count;
                    MagnitudeCombination[k].Count =
                    MagnitudeCombination[k].Count −
                        MagnitudeCombination[l].Count;
                    MagnitudeCombination[l].Count = 0;
                end if
            else
                destinationServerCount = destinationServerCount +
                    MagnitudeCombination[k].Count;
                MagnitudeCombination[l].Count =
                MagnitudeCombination[l].Count −
                    MagnitudeCombination[k].Count;
                MagnitudeCombinatino[k[.Count = 0;
    end for
end for
```

Figure 4:
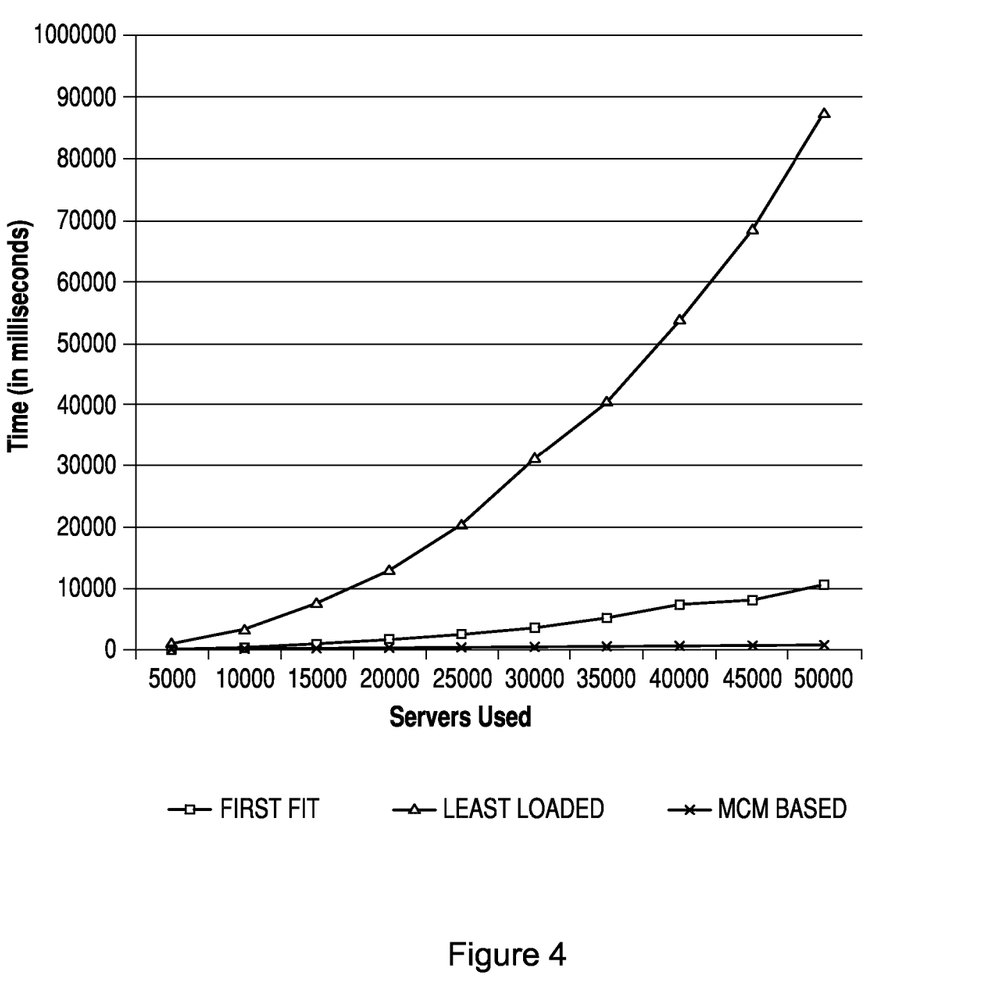
FIG. 4 is a graph of a performance comparison between the FFD, LL and an embodiment considering a two-dimensional vector packing problem.

The performance of the instant vector packing solution provides significant advances over the prior art. These improvements are in terms of time to completion and variable granularity, among others. The prior art evaluates each dimensional value independently of other dimensional values, resulting in slow performance and unpredictable time to completion. The disclosed embodiments 100 consider all dimensional values simultaneously and significantly outperforms the prior art, especially when considering large data sets. Referring now to FIG. 4 and Table 6, a performance comparison of the prior art and the disclosed MCM-based method is provided. All methods compared consider a two-dimensional vector packing problem and the MCM-based method implements a MCM of 10-subunits having equal distribution intervals. As is understood by those skilled in the art, the MCM-based method provides predictable increases in time to completion for increased server counts. The FFD and LL methods, in comparison, experience extreme performance degradation, i.e., substantially increased time to completion, when the existing server count is increased. This disparity becomes more pronounced as the number of dimensions considered is increased. The accuracy of the MCM-based method may be improved by increasing the number of distribution intervals, analyzing historical data pertaining to the how the MCM may be defined and the incidence or frequency of particular dimensional values, implementing non-uniform distribution intervals, or a combination thereof. It is to be further appreciated by those skilled in the art that the benefit of the disclosed embodiments are made apparent in highly dynamic environments where dimensional values are subject to frequent change. That is, in the server consolidation context, as resource utilizations increase, e.g., CPU, memory, disk, I/O, network, etc., the vector packing problem may readily be reassessed as needed to provide an optimal result.

TABLE 6

| | No. Destination Servers/Time (ms) | | |
|---|---|---|---|
| No. Existing Servers | First Fit | Least Loaded | New MCM Method |
| 5,000 | 2,636/ 227 ms | 2,652/ 1,081 ms | 2,726/ 159 ms |
| 10,000 | 5,200/ 542 ms | 5,337/ 3,424 ms | 5,469/ 194 ms |
| 15,000 | 7,628/ 1,107 ms | 7,894/ 7,615 ms | 8,185/ 343 ms |
| 20,000 | 10,106/ 1,726 ms | 10,501/ 12,951 ms | 10,952/ 404 ms |
| 25,000 | 12,570/ 2,492 ms | 13,116/ 20,422 ms | 13,672/ 431 ms |
| 30,000 | 15,031/ 3685 ms | 15,641/ 31,157 ms | 16,385/ 577 ms |
| 35,000 | 17,597/ 5,282 ms | 18,344/ 40,484 ms | 19,124/ 637 ms |
| 40,000 | 19,996/ 7,530 ms | 20,919/ 53,962 ms | 21,835/ 611 ms |
| 45,000 | 22,453/ 8,064 ms | 23,501/ 68,513 ms | 24,630/ 656 ms |
| 50,000 | 24,755/ 10,761 ms | 25,997/ 87,634 ms | 27,289/ 787 ms |

In an another embodiment, the consolidation process 300 may include an additional step where the arrangement of the final packed combinations in the combination matrix, as well as the elements removed at step 301, are stored in a database, or other suitable structure known in the art, for retrieval or further processing. The arrangement of packed combinations referred to here are the combinations represented by the packed combination count, or destination servers.

Figure 5:
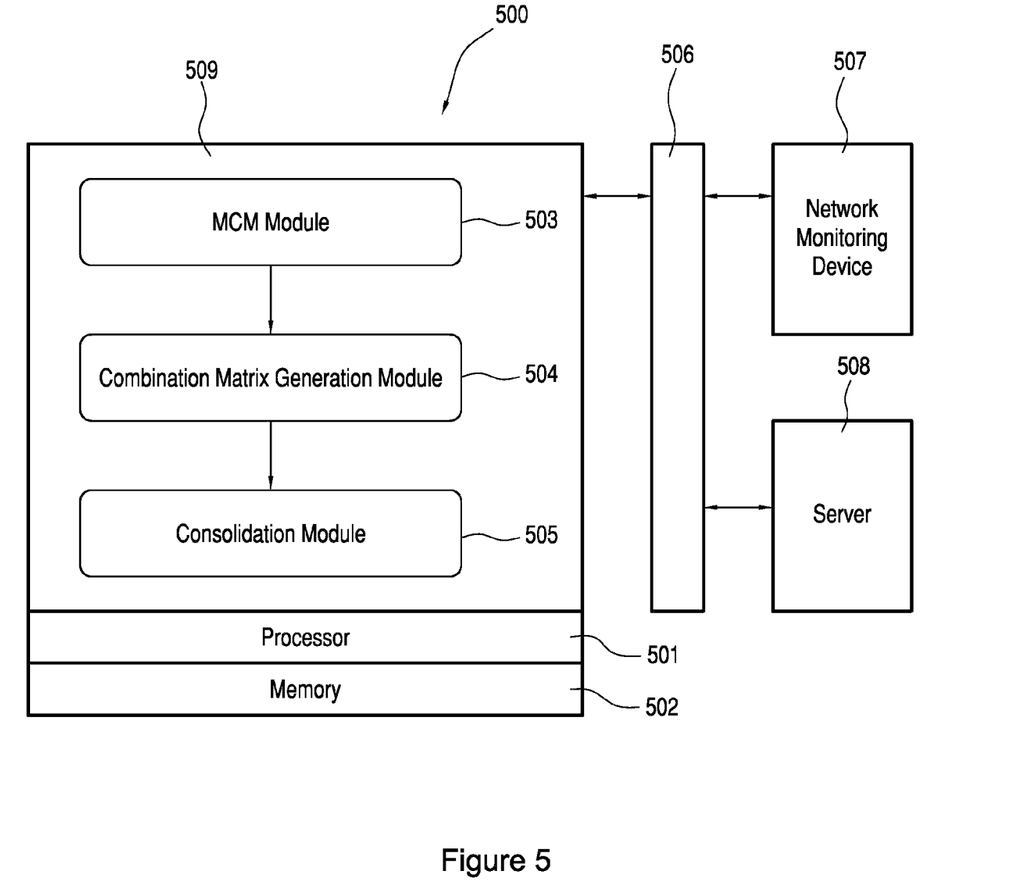
FIG. 5 is a functional flow block diagram of an exemplary system.

Referring to FIG. 5, a further embodiment 500 may include a computer 509 having at least a processor 501 and memory 502, an MCM Module 503, a Combination Matrix Generation Module 504, and a Consolidation Module 505. MCM Module 503 may comprise a previously defined MCM, dynamically generated MCM, or an MCM input by a user or device that is conveyed via any appropriate means as is understood in the art. Combination Matrix Generation Module 504 may perform in accordance with the embodiments of block 102, discussed herein. Similarly, Consolidation Module 505 may perform in accordance with embodiments of block 103, described herein, and may include embodiments of block 104. In yet a further embodiment, the embodiment 500 may include a network 506, as is understood to those skilled in the art, for communication with between devices or systems 507, 508, 509. The various modules consist of computer software code recorded on computer readable media and executed by a processor. The modules are segregated by function in this description but need not be discrete devices or code portions. The modules can be segregated or integrated in any manner. Various computer devices can be used, such as Servers, PCs, tablets, handheld computing devices, or various combinations of such devices.

Application of the embodiments is not limited to the server consolidation context. Instead, it may be applied to any multi-dimensional vector packing problem as appropriate. The embodiments described herein may be implemented via any appropriate computing environment, as understood by those skilled in the art. Further, the embodiments, in the server consolidation context, may interface with other software, hardware or any other appropriate means for gathering, storing and retrieving resource utilization data. By non-limiting example, the disclosed embodiments may interface with a router or other network-monitoring platform or device 507 for gathering usage data for determining the appropriate MCM or threshold values to be used. By further example, the disclosed embodiments may provide a server, network monitoring device, or other device 508 known in the art a server consolidation determination, a server consolidation plan, or the arrangement of packed combinations to a third-party, including users, a central server, or a data center.

What is claimed is:

1. A computer-implemented method of server consolidation executed by one or more computing devices for determining optimal combinations of existing computer servers represented by multi-dimensional elements for allocation to a plurality of destination servers, each dimension for each multi-dimensional element representing a respective computer server resource utilization and corresponding to a classification in a plurality of classifications, the method comprising:
    removing, by at least one of the one or more computing devices, all multi-dimensional elements from a combination matrix which have a dimension corresponding to a highest classification in the plurality of classifications, wherein the combination matrix comprises a plurality of multi-dimensional elements in a sorted combinational order descending from a first end of the combination matrix to a second end of the combination matrix;
    iteratively combining, by at least one of the one or more computing devices, one or more multi-dimensional elements from a first end of the combination matrix and one or more multi-dimensional elements from a second end of the combination matrix to generate one or more combined multi-dimensional elements;
    incrementing, by at least one of the one or more computing devices, a count of packed combinations when a combined multi-dimensional element in the one or more combined multi-dimensional elements has a dimension corresponding to the highest classification in the plurality of classifications;
    removing, by at least one of the one or more computing devices, a first combined multi-dimensional element in the one or more combined multi-dimensional elements from the combination matrix when the combined multi-dimensional element has a dimension corresponding to the highest classification in the plurality of classifications;
    associating a destination server out of the destination servers with the removed first combined multi-dimensional element; and
    allocating the existing computer servers represented by the first combined multi-dimensional element to the destination server, wherein the combined multi-dimensional element represents, via its dimensions, computer server resource utilization of the existing computer servers represented by the first combined multi-dimensional element.

2. The method of claim 1, wherein the plurality of classifications correspond to a plurality of distribution intervals and wherein each multi-dimensional element is created by:
    assigning, for each of a plurality of continuous values for a plurality of dimensions, each individual continuous value to one of the classifications in the plurality of classifications based on which of the plurality of distribution intervals includes the individual continuous value; and
    generating the multi-dimensional element from the classifications assigned to the plurality of continuous values for the plurality of dimensions.

3. The method of claim 2, wherein the iteratively combining comprises:
    determining, by at least one of the one or more computing devices, whether the distribution interval associated with a combined continuous value resulting from a combination of a first individual continuous value and a second individual continuous value corresponds to the highest classification, wherein the first individual continuous value is associated with a dimension of a multi-dimensional element from the first end of the combination matrix and the second individual continuous value is associated with the same dimension of a second multi-dimensional element from the second end of the combination matrix;
    assigning, by at least one of the one or more computing devices, the highest magnitude classification to the dimension of a first multi-dimensional element based at least in part on a determination that the distribution interval associated with the combined continuous value exceeds the highest magnitude classification;
    incrementing, by at least one of the one or more computing devices, the count of packed combinations based at least in part on a determination that the distribution interval associated with the combined continuous value exceeds the highest magnitude classification; and
    combining, by at least one of the one or more computing devices, the second multi-dimensional element with the first multi-dimensional element based at least in part on a determination that the distribution interval associated with the combined continuous value does not exceed the highest magnitude classification.

4. The method of claim 3, wherein the first multi-dimensional element is a combined multi-dimensional element.

5. The method of claim 1, further comprising transmitting, by at least one of the one or more computing devices, data representative of the one or more combined multi-dimensional elements to a computing device external to the one or more computing devices executing the method.

6. The method of claim 1, wherein each classification represents a resource utilization level of the corresponding computing resource for that dimension and one or more processors receives resource utilization data from a network monitoring device.

7. The method of claim 1, wherein the first end is a front end of the combination matrix and the second end is a back end of the combination matrix.

8. The method of claim 1, wherein the computer server resource utilization comprises:
CPU, memory, data storage, input/output, networking bandwidth, network topology, or router utilizations.

9. A server consolidation system for determining optimal combinations of existing computer servers represented by multi-dimensional elements for allocation to a plurality of destination servers, each dimension for each multi-dimensional element representing a respective computer server resource utilization and corresponding to a classification in a plurality of classifications, the system comprising:
one or more processors; and
one or more memories operatively coupled to at least one of the one or more processors and having instructions stored thereon that, when executed by at least one of the one or more processors, cause at least one of the one or more processors to:
remove all multi-dimensional elements from a combination matrix which have a dimension corresponding to a highest classification in the plurality of classifications, wherein the combination matrix comprises a plurality of multi-dimensional elements in a sorted combinational order descending from a first end of the combination matrix to a second end of the combination matrix;
iteratively combine one or more multi-dimensional elements from a first end of the combination matrix and one or more multi-dimensional elements from a second end of the combination matrix to generate one or more combined multi-dimensional elements;
increment a count of packed combinations when a combined multi-dimensional element in the one or more combined multi-dimensional elements has a dimension corresponding to the highest classification in the plurality of classifications;
remove a first combined multi-dimensional element in the one or more combined multi-dimensional elements from the combination matrix when the combined multi-dimensional element has a dimension corresponding to the highest classification in the plurality of classifications;
associating a destination server out of the destination servers with the removed first combined multi-dimensional element; and
allocating the existing computer servers represented by the first combined multi-dimensional element to the destination server, wherein the combined multi-dimensional element represents, via its dimensions, computer server resource utilization of the existing computer servers represented by the first combined multi-dimensional element.

10. The system of claim 9, wherein the plurality of classifications correspond to a plurality of distribution intervals and wherein each multi-dimensional element is created by:
assigning, for each of a plurality of continuous values for a plurality of dimensions, each individual continuous value to one of the classifications in the plurality of classifications based on which of the plurality of distribution intervals includes the individual continuous value; and
generating the multi-dimensional element from the classifications assigned to the plurality of continuous values for the plurality of dimensions.

11. The system of claim 10, wherein the instructions that, when executed by at least one of the one or more processors, cause at least one of the one or more processors to iteratively combine further cause at least one of the one or more processors to:
determine whether the distribution interval associated with a combined continuous value resulting from a combination of a first individual continuous value and a second individual continuous value corresponds to the highest classification, wherein the first individual continuous value is associated with a dimension of a multi-dimensional element from the first end of the combination matrix and the second individual continuous value is associated with the same dimension of a second multi-dimensional element from the second end of the combination matrix;
assign the highest magnitude classification to the dimension of a first multi-dimensional element based at least in part on a determination that the distribution interval associated with the combined continuous value exceeds the highest magnitude classification;
increment the count of packed combinations based at least in part on a determination that the distribution interval associated with the combined continuous value exceeds the highest magnitude classification; and
combine the second multi-dimensional element with the first multi-dimensional element based at least in part on a determination that the distribution interval associated with the combined continuous value does not exceed the highest magnitude classification.

12. The system of claim 11, wherein the first multi-dimensional element is a combined multi-dimensional element.

13. The system of claim 9, wherein at least one of the one or more memories has further instructions stored thereon that, when executed by at least one of the one or more processors, cause at least one of the one or more processors to transmit data representative of the one or more combined multi-dimensional elements to an external computing device.

14. The system of claim 9, wherein each classification represents a resource utilization level of the corresponding computing resource for that dimension and at least one of the one or more processors receives resource utilization data from a network monitoring device.

15. The system of claim 9, wherein the first end is a front end of the combination matrix and the second end is a back end of the combination matrix.

16. The system of claim 9, wherein computer server resources represented by the dimensions comprise:

CPU, memory, data storage, input/output, networking bandwidth, network topology, or router utilizations.

17. At least one non-transitory computer-readable medium storing computer-readable instructions that, when executed by one or more computing devices, cause at least one of the one or more computing devices to perform a method of server consolidation for determining optimal combinations of existing computer servers represented by multi-dimensional elements for allocation to a plurality of destination servers, each dimension for each multi-dimensional element representing a respective computer server resource utilization and corresponding to a classification in a plurality of classifications, the method comprising:
    removing all multi-dimensional elements from a combination matrix which have a dimension corresponding to a highest classification in a plurality of classifications, wherein the combination matrix comprises a plurality of multi-dimensional elements in a sorted combinational order descending from a first end of the combination matrix to a second end of the combination matrix;
    iteratively combining one or more multi-dimensional elements from a first end of the combination matrix and one or more multi-dimensional elements from a second end of the combination matrix to generate one or more combined multi-dimensional elements;
    incrementing a count of packed combinations when a combined multi-dimensional element in the one or more combined multi-dimensional elements has a dimension corresponding to the highest classification in the plurality of classifications;
    removing a first combined multi-dimensional element in the one or more combined multi-dimensional elements from the combination matrix when the combined multi-dimensional element has a dimension corresponding to the highest classification in the plurality of classifications;
    associating a destination server out of the destination servers with the removed first combined multi-dimensional element; and
    allocating the existing computer servers represented by the first combined multi-dimensional element to the destination server, wherein the combined multi-dimensional element represents, via its dimensions, computer server resource utilization of the existing computer servers represented by the first combined multi-dimensional element.

18. The at least one non-transitory computer-readable medium of claim 17, wherein the plurality of classifications correspond to a plurality of distribution intervals and wherein each multi-dimensional element is created by:
    assigning, for each of a plurality of continuous values for a plurality of dimensions, each individual continuous value to one of the classifications in the plurality of classifications based on which of the plurality of distribution intervals includes the individual continuous value; and
    generating the multi-dimensional element from the classifications assigned to the plurality of continuous values for the plurality of dimensions.

19. The at least one non-transitory computer-readable medium of claim 18, wherein the computer-readable instructions that, when executed by at least one of the one or more computing devices, cause at least one of the one or more computing devices to iteratively combine further cause at least one of the one or more computing devices to:
    determine whether the distribution interval associated with a combined continuous value resulting from a combination of a first individual continuous value and a second individual continuous value corresponds to the highest classification, wherein the first individual continuous value is associated with a dimension of a multi-dimensional element from the first end of the combination matrix and the second individual continuous value is associated with the same dimension of a second multi-dimensional element from the second end of the combination matrix;
    assign the highest magnitude classification to the dimension of a first multi-dimensional element based at least in part on a determination that the distribution interval associated with the combined continuous value exceeds the highest magnitude classification;
    increment the count of packed combinations based at least in part on a determination that the distribution interval associated with the combined continuous value exceeds the highest magnitude classification; and
    combine the second multi-dimensional element with the first multi-dimensional element based at least in part on a determination that the distribution interval associated with the combined continuous value does not exceed the highest magnitude classification.

20. The at least one non-transitory computer-readable medium of claim 19, wherein the first multi-dimensional element is a combined multi-dimensional element.

21. The at least one non-transitory computer-readable medium of claim 17, further storing computer-readable instructions that, when executed by at least one of the one or more computing devices, cause at least one of the one or more computing devices to: transmit data representative of the one or more combined multi-dimensional elements to a computing device external to the one or more computing devices executing the instructions.

22. The at least one non-transitory computer-readable medium of claim 17, wherein each classification represents a resource utilization level of the corresponding computing resource for that dimension and one or more processors receives resource utilization data from a network monitoring device.

23. The at least one non-transitory computer-readable medium of claim 17, wherein the first end is a front end of the combination matrix and the second end is a back end of the combination matrix.

24. The at least one non-transitory computer-readable medium of claim 17, wherein computer server resources represented by the dimensions comprise:
    CPU, memory, data storage, input/output, networking bandwidth, network topology, and router utilizations.

* * * * *